United States Patent
Foley et al.

(10) Patent No.: US 9,536,411 B2
(45) Date of Patent: Jan. 3, 2017

(54) BIOMETRIC MONITORING AND ALERTING FOR A VEHICLE

(71) Applicant: Toyota Motor Engineering & Manufacturing North America, Inc., Erlanger, KY (US)

(72) Inventors: James Peter Foley, Canton, MI (US); Emery Charles Gulash, Ann Arbor, MI (US); Kazutoshi Ebe, Novi, MI (US); Yifan Jiang, Bloomfield Hills, MI (US); Warren Jing Po Chou, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 132 days.

(21) Appl. No.: 14/453,826

(22) Filed: Aug. 7, 2014

(65) Prior Publication Data

US 2016/0042627 A1 Feb. 11, 2016

(51) Int. Cl.
| | | |
|---|---|---|
| *G08B 23/00* | (2006.01) | |
| *G08B 21/02* | (2006.01) | |
| *G08B 21/06* | (2006.01) | |
| *B60Q 9/00* | (2006.01) | |
| *G08B 21/24* | (2006.01) | |

(52) U.S. Cl.
CPC ............ *G08B 21/0211* (2013.01); *B60Q 9/00* (2013.01); *G08B 21/0283* (2013.01); *G08B 21/06* (2013.01); *G08B 21/24* (2013.01)

(58) Field of Classification Search
CPC . G08B 21/0211; G08B 21/0283; G08B 21/24; B60Q 9/00

USPC .......................................................... 340/576
See application file for complete search history.

(56) References Cited

U.S. PATENT DOCUMENTS

| | | | |
|---|---|---|---|
| 8,022,831 B1 | 9/2011 | Wood-Eyre | |
| 8,604,932 B2 | 12/2013 | Breed et al. | |
| 8,626,382 B2 | 1/2014 | Obradovich | |
| 8,692,739 B2* | 4/2014 | Mathieu | B60R 1/00 340/436 |
| 2008/0180257 A1* | 7/2008 | Omi | G08B 21/06 340/575 |
| 2011/0224875 A1 | 9/2011 | Cuddihy et al. | |
| 2011/0267186 A1* | 11/2011 | Rao | B60K 28/08 340/449 |
| 2012/0098655 A1* | 4/2012 | Preta | B60Q 1/0023 340/438 |

(Continued)

FOREIGN PATENT DOCUMENTS

| | | |
|---|---|---|
| CN | 201302393 U | 7/2013 |
| WO | 0247942 A2 | 6/2002 |
| WO | 2013136156 A1 | 9/2013 |

OTHER PUBLICATIONS

Extended European Search Report for EP Appl. No. 15180255.0, dated Dec. 8, 2015, 12 pages.

*Primary Examiner* — Kerri McNally
(74) *Attorney, Agent, or Firm* — Christopher G. Darrow; Darrow Mustafa PC

(57) ABSTRACT

A computer storage medium has embodied thereon computer-readable instructions that, when executed, perform a method for identifying biometric markers within a vehicle. The method includes detecting a biometric marker of a driver within the vehicle and displaying data associated with the biometric marker to the driver.

20 Claims, 3 Drawing Sheets

(56) References Cited

U.S. PATENT DOCUMENTS

| | | | |
|---|---|---|---|
| 2012/0256749 A1* | 10/2012 | Rao | A61B 5/0022 |
| | | | 340/573.1 |
| 2013/0009761 A1 | 1/2013 | Horseman | |
| 2013/0231800 A1 | 9/2013 | Ricci | |
| 2013/0307706 A1* | 11/2013 | Kriezman | B60Q 1/503 |
| | | | 340/988 |
| 2014/0253314 A1* | 9/2014 | Rambadt | B60N 2/002 |
| | | | 340/457.1 |

* cited by examiner

BIOMETRIC MONITORING AND ALERTING FOR A VEHICLE

BACKGROUND

The present disclosure relates to a vehicle and more particularly to a biometric monitoring system therefor.

Some vehicles include systems that enable an occupant to manually initiate emergency calls by depressing an emergency button within the vehicle or that automatically initiate an emergency call upon deployment of an air bag in the event of a collision. The emergency call indicates the geographic location of the vehicle, and establishes voice communication between the passenger compartment and a remote human adviser. If the adviser determines that emergency attention is necessary because of occupant response, or because there was no response, the adviser may dispatch an emergency responder. Such systems thereby require interaction with and reliance upon a human adviser, who may be inefficient and less than effective.

Other vehicles include a vehicle interior monitoring system. Based on recognition of an occupant, the vehicle may change a configuration of the vehicle to match predetermined preferences for the driver and/or passengers. Such systems require the system to be preprogrammed to match the predetermined preferences.

SUMMARY

The biometric marker system described herein apprises a driver of a vehicle to his or her health status. The biometric marker system monitors and/or analyzes one or more biometric markers of the driver to identify whether the driver is drowsy or otherwise impaired such as from an allergic reaction or heart problem. The biometric marker system may also monitor and/or analyze one or more biometric markers of other occupants within the vehicle after the driver has exited the vehicle. The biometric marker system may communicate an alert to the driver and/or an emergency responder that indicates that a biometric marker is outside of a predetermined parameter.

A computer storage medium having embodied thereon computer-readable instructions that, when executed, perform a method. The method, according to one disclosed non-limiting embodiment, includes detecting a biometric marker of a driver and displaying data associated with the biometric marker on a side window of the vehicle.

A computer storage medium having embodied thereon computer-readable instructions that, when executed, perform a method. According to one disclosed non-limiting embodiment, the method includes detecting a biometric marker within the vehicle; and displaying data associated with the biometric marker on a personal electronic device external to the vehicle.

A computer storage medium having embodied thereon computer-readable instructions that, when executed, perform a method. According to one disclosed non-limiting embodiment, the method includes detecting that a driver has exited the vehicle; detecting a biometric marker within the vehicle subsequent to detecting that the driver has exited the vehicle; and displaying data associated with the biometric marker on a personal electronic device.

The foregoing features and elements may be combined in various combinations without exclusivity, unless expressly indicated otherwise. These features and elements, as well as the operation thereof, will become more apparent in light of the following description and the accompanying drawings. It should be understood, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A biometric marker system and a method of detecting, identifying, monitoring and/or analyzing biometric markers within a vehicle, as well as associated computer program products embodied in one or more computer-readable media having computer-readable program code embodied thereon, are disclosed. The biometric marker system can apprise a driver of a vehicle to his or her health status within the vehicle. Such apprising can be provided in a format for infotainment purposes, in a format to monitor driver health and/or as an alert when one or more of the biometric markers substantially changes or is outside a predetermined parameter. The biometric marker system may function at least in part to keep the driver interested and/or engaged in the driving experience and/or apprise the driver of health conditions. The biometric marker system may also project such health information on a vehicle window, such as a side window, so the driver is readily provided with health information. The projecting of such health information can be done pre- and post-travel. In some arrangements, the biometric marker system may also detect, identify, monitor and/or analyze one or more biometric markers of other occupants within the vehicle, after the driver has exited the vehicle. In response to the analysis of the biometric markers, various levels and/or sequences of alerts may be communicated to a personal electronic device of the driver. If one or more of the biometric markers substantially changes or is outside a predetermined parameter (e.g. a dangerously high occupant temperature) and if the driver is not responsive, the biometric marker system can effectuate communication with an emergency responder or other individual or entity.

Figure 1:
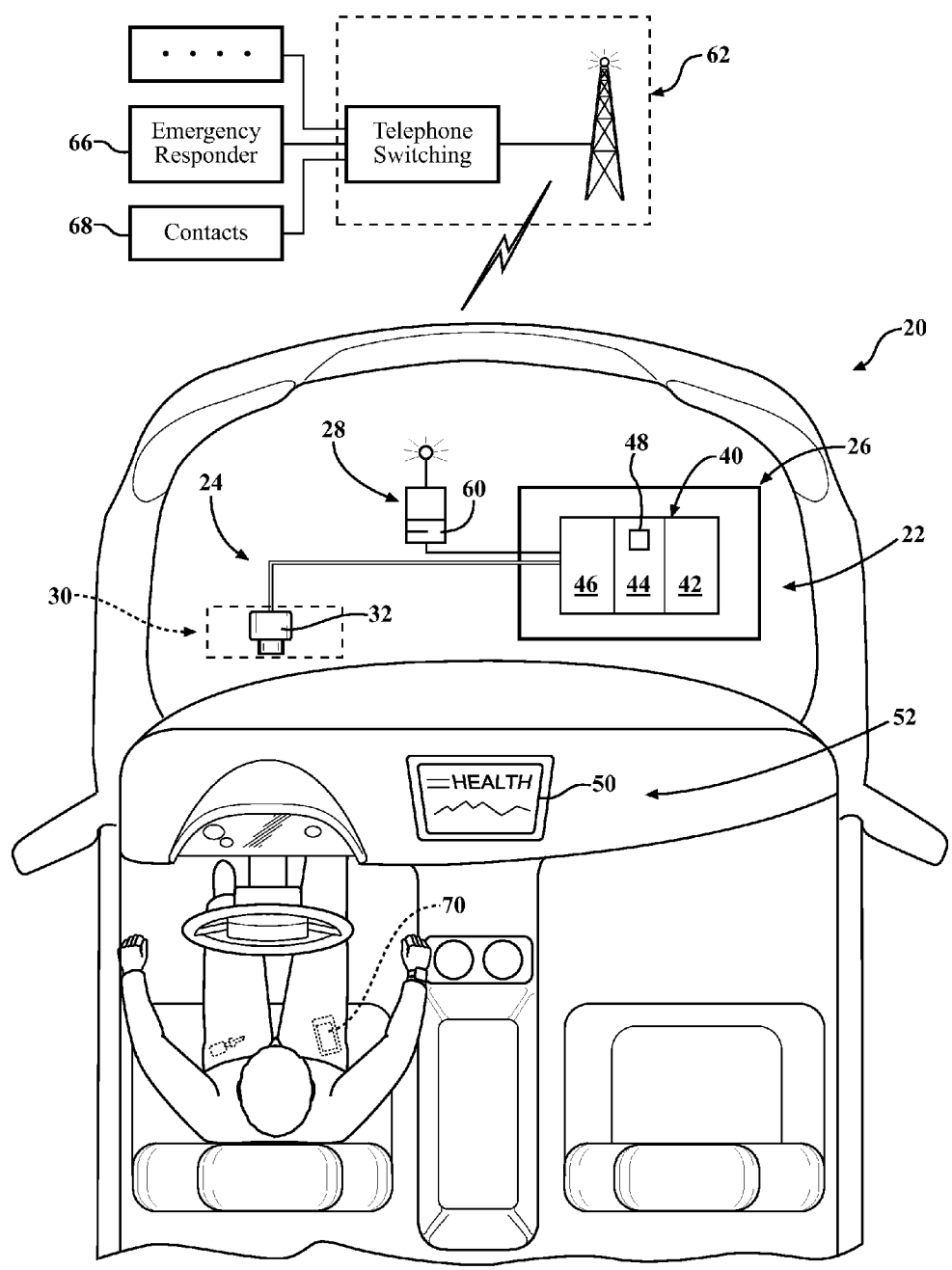
FIG. 1 is a schematic of an example vehicle for use with a biometric marker system.

FIG. 1 schematically illustrates a vehicle 20 with a biometric marker system 22. While FIG. 1 shows the vehicle 20 as being an automobile, it will be understood that embodiments are not limited to automobiles. In some implementations, the vehicle may be a watercraft, an aircraft or any other form of mechanized transport. The biometric marker system 22 generally includes a sensor system 24, a control system 26, and a communication system 28. It should be appreciated that although particular systems are separately defined, each or any of the systems or portions thereof may be otherwise combined or segregated via hardware and/or software within the biometric marker system 22.

The systems 24, 26, 28 can be communicatively linked in any suitable manner, such as through one or more communication networks. As used herein, the term "communicatively linked" can include direct or indirect connections through a communication channel or pathway or another component or system. A "communication network" means one or more components designed to facilitate the delivery of information from one source to another.

The one or more communication networks can be configured to communicate via a wireless and/or wired medium. The one or more communication networks can be implemented as, or include, without limitation, a wide area network (WAN), wireless wide area network (WWAN), a local area network (LAN), a personal area network (PAN) (e.g. IRDA, wireless USB, ZigBee network, body area network or near field communication network), wireless local area network (WLAN), the Internet, the Public Switched Telephone Network (PSTN), a wireless network, a mobile network, a Virtual Private Network (VPN), the Internet, and/or one or more intranets. The communication network(s) can include any combination of the above networks and/or other types of networks. The communication network(s) can include one or more routers, switches, access points, wireless access points, and/or the like.

The sensor system 24 may include various sensors operable to detect and/or identify a condition within the vehicle 20. In one disclosed non-limiting embodiment, the sensor system 24 can include one or more biometric sensors 30, which may also include a driver sensor 32. The one or more biometric sensors 30 can be operatively positioned to detect and/or identify one or more biometric markers of a living entity (e.g. the driver, a passenger, a child, or a pet) within the passenger compartment of the vehicle 20.

A "biometric marker" is any data related to physiological, behavioral, biological or other characteristics that indicate or suggest a state or condition of a living entity. Biometric markers or "biomarkers" of the living entities may be measured and evaluated to observe biometric processes, pathogenic processes, or other responses. Examples of biometric markers include, but are not limited to, heart rate, skin temperature, eye movements, sudden bodily movements, respiration, perspiration, speech or sound patterns, and/or other biometric markers. The biometric markers may be analyzed and/or otherwise processed by the biometric marker system 22 to, for example, determine a state or condition of an occupant. For instance, the biometric markers may be analyzed and/or otherwise processed by the biometric marker system 22 to determine whether the driver is drowsy or otherwise impaired such as from an allergic reaction or heart problem.

The control system 26 generally includes a control module 40 with a processor 42, a memory 44, and an interface 46. The control module 40 may be a portion of a central vehicle control, a stand-alone unit, a cloud-based system, or other system. The processor 42 can be any component or group of components that are configured to execute any of the processes described herein. The processor 42 may be implemented with one or more general-purpose and/or special-purpose processors having desired performance characteristics. Examples of suitable processors 42 include microprocessors, microcontrollers, DSP processors, and other circuitry that can execute software.

The memory 44 may include any type of computer-readable medium that stores the data and control algorithms 48 described herein below. Other operational software for the processor 42 may also be stored in the memory 44. The memory 44 can include volatile and/or non-volatile memory. Examples of suitable memory 44 may include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 44 can be operatively connected to the processor 42 for use thereby. The term "operatively connected" can include direct or indirect connections, including connections without direct physical contact.

Figure 2:
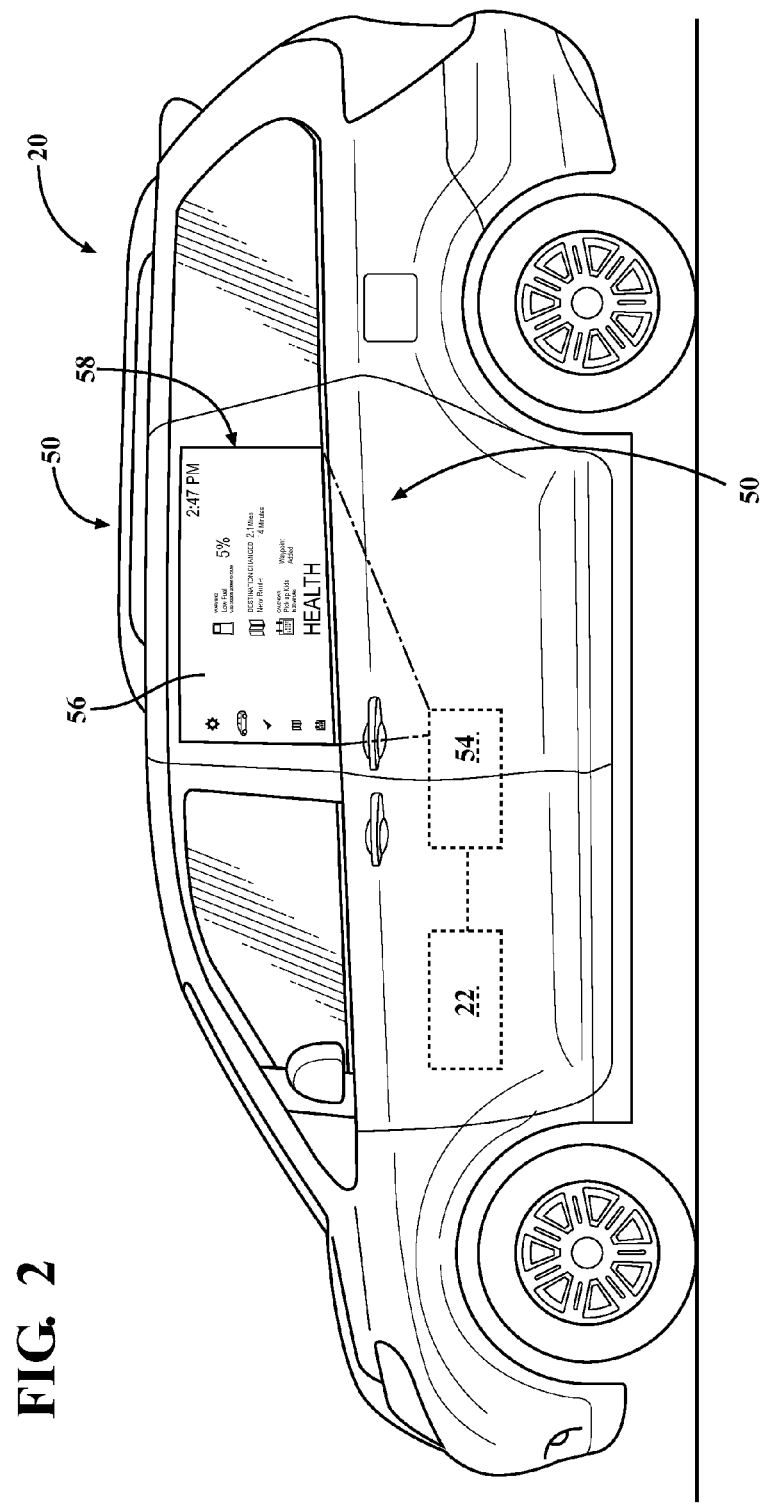
FIG. 2 is a side view of an example vehicle for use with a biometric marker system.

The interface 46 can facilitate communication between the sensor system 24, the communication system 28, and other vehicle systems, including, for example, a display 50 in an interface 52 (e.g. a vehicle-human machine interface). The display 50 may alternatively or additionally include a projector 54 and a coating 56 or other treatment on a vehicle window 58 to allow information presented on the display 50 to be visible from outside the vehicle 20 (FIG. 2) and/or from inside of the vehicle 20. Although the window 58 is here shown as a driver's side passenger window of a minivan type vehicle, it will of course be understood that arrangements are not limited to these examples, and it should be appreciated that various vehicle types and windows will also benefit herefrom.

The communication system 28 further includes a wireless communication system 60 that is operable to communicate with an offboard system 62. The offboard system 62 may include, for example, a remote communication unit or station that, in turn, may establish communication with another network component. The network component provides communication with individuals, devices, components and/or entities external to the vehicle 20, such as an emergency responder 66 or other contact 68. Emergency responders 66 may include, for example, police, ambulance, 911 public safety access points, etc. The contacts 68 may include, for example, entities preprogrammed by the user into the biometric marker system 22 and/or a personal electronic device 70 in communication therewith.

The personal electronic device 70 includes, but is not limited to, a portable computer (e.g. a laptop, a tablet or the like), a mobile telephone, a smart phone, a smart watch, smart eyeglasses, wireless-enabled personal digital assistant or another such device that is typically carried or worn by the driver. Further, the personal electronic device 70 may be operable to process data associated with biometric markers and communicate such data to the control system 26 via the communication system 28. The biometric marker system 22 may be communicatively linked with the personal electronic device 70 in any suitable manner, such as through one or more communication networks including various wireless data communication protocols and/or other wireless technology standards that exchange data.

Figure 3:
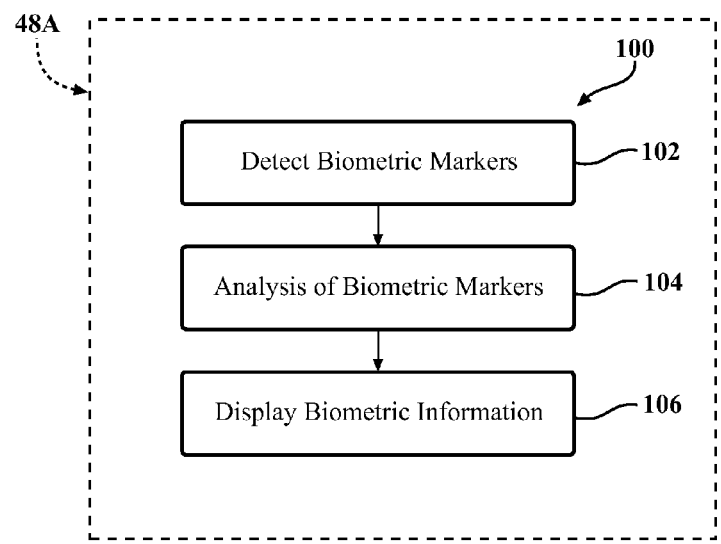
FIG. 3 is a flow chart illustrating operations of a biometric marker system according to one disclosed non-limiting embodiment.

With reference to FIG. 3, in one disclosed non-limiting embodiment, an algorithm 48A for operation of the biometric marker system 22 is schematically illustrated. The functions of the algorithm 48A are disclosed in terms of functional block diagrams and it should be appreciated that these functions may be enacted in either dedicated hardware circuitry or programmed software routines or instructions on a computer-readable storage medium for execution as instructions in a microprocessor-based electronics control embodiment such as the control system 26.

The algorithm 48A provides a method 100 of detecting and processing biometric markers of a vehicle driver. At step 102, one or more biometric markers of the driver can be detected. Such detecting can be performed using the driver sensor 32 and/or the personal electronic device 70. The one or more detected biometric markers can be communicated to the control system 26. At step 104, the one or more detected biometric markers can be interpreted and/or analyzed. For example, the one or more biometric markers can be compared to one or more predetermined parameters. Alternatively or in addition, the one or more biometric markers can be analyzed to determine driver health and/or level of driver alertness.

In response to analyzing the biometric markers, biometric information can be displayed at step 106. The biometric marker system 22 is operable to display the biometric information on the display 50. For example, the biometric markers may be presented as health information in a format for infotainment purposes, in a format to monitor driver health, and/or as an alert when one or more of the biometric markers substantially changes or is outside predetermined parameters or normal values. The biometric marker system 22 can function at least in part to keep the driver interested and/or engaged in the driving experience and/or apprised of a health condition.

In addition, by displaying the health information on the vehicle side window 58 (FIG. 2), a driver is readily provided with health information pre- and post-travel. The driver may thus be apprised of a health condition even before they enter the vehicle 20 and is thereby alerted to potentially non-optimal physiological or other parameters such that the driver may decide to delay travel until they are more rested or when biometric markers are within predetermined parameters.

Figure 4:
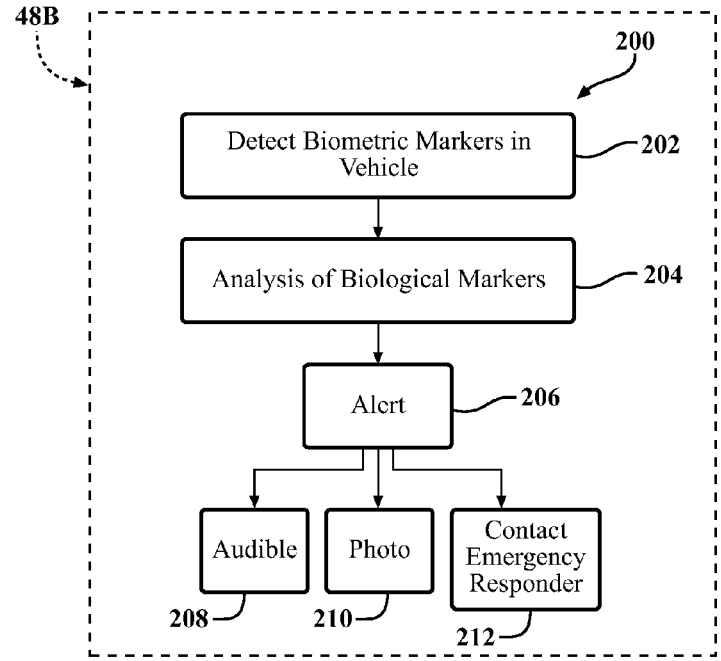
FIG. 4 is a flow chart illustrating operations of a biometric marker system according to another disclosed non-limiting embodiment.

With reference to FIG. 4, in another disclosed non-limiting embodiment, an algorithm 48B for operation of the biometric marker system 22 is schematically illustrated. The functions of the algorithm 48B are disclosed in terms of functional block diagrams and it should be appreciated that these functions may be enacted in either dedicated hardware circuitry or programmed software routines or instructions on a computer readable storage medium for execution as instructions in a microprocessor based electronics control embodiment such as the control system 26.

The algorithm can provide a method 200 of detecting and processing biometric markers within the vehicle passenger compartment. At step 202, one or more biometric markers within the vehicle passenger compartment can be detected. Such detecting can be performed using the biometric sensors 30 of the sensor system 24. The one or more detected biometric markers can be communicated to the control system 26. At step 204, the one or more detected biometric markers can be interpreted and/or analyzed. For example, the one or more biometric markers can be compared to one or more predetermined parameters. Alternatively or in addition, the one or more biometric markers can be analyzed to determine the presence of a child, a pet, or other non-driver occupant in the vehicle 20 after the driver exits the vehicle 20. Determination of driver absence from the vehicle may be performed with respect to a weight or pressure sensor in the driver seat, a proximity sensor, the location of the personal electronic device 70 and/or by other methods.

The biometric markers may be further analyzed to determine a condition of the non-driver occupant. For example, the biometric marker system 22 can be utilized to determine heart rate, temperature, movement, respiration, perspiration, speech or sound patterns, and/or other factors of the non-driver occupant to determine whether a state or condition (e.g. a health condition) of the non-driver occupant is within normal parameters.

In response to receiving the analyzed biometric markers, the biometric marker system 22 is operable to communicate an alert to the personal electronic device 70 of the driver via the communication system 28 (step 206). In one disclosed non-limiting embodiment, the biometric marker system 22 can generate one or more alerts to the personal electronic device 70. The one or more alerts may include an audible alert 208 and/or an image (e.g. photograph 210) of the vehicle passenger compartment. Further, if no response from the driver is acquired, the biometric marker system 22 can directly alert another individual or entity (e.g. the emergency responder 66) at step 212. That is, various levels and/or sequences of alerts may be generated in response to the analysis of the biometric markers. For example, determination of a dangerously high occupant temperature may result in immediate communication with the emergency responder 66. In some arrangements, the biometric marker system 22 can present an alert on the display 50.

Furthermore, arrangements described herein may take the form of a computer program product embodied in one or more computer-readable media having computer-readable program code embodied, e.g., stored, thereon.

Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments presented herein are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A non-transitory computer storage medium having embodied thereon computer-readable instructions that, when executed, perform a method comprising:
   detecting a biometric marker of a driver of a vehicle; and
   projecting health condition data associated with the biometric marker on a window of the vehicle,
   wherein the health condition data associated with the biometric marker is projected on the window pre-travel, before the driver enters the vehicle.

2. The non-transitory computer storage medium as recited in claim 1, wherein the biometric marker is associated with driver alertness.

3. The non-transitory computer storage medium as recited in claim 1, wherein the biometric marker includes a heart rate.

4. The non-transitory computer storage medium as recited in claim 1, wherein the biometric marker includes a temperature.

5. The non-transitory computer storage medium as recited in claim 1, wherein the biometric marker includes an eyelid closure rate.

6. The non-transitory computer storage medium as recited in claim 1, wherein the detecting is performed via a personal electronic device of the driver.

7. The non-transitory computer storage medium as recited in claim 1, wherein the detecting is performed via a driver sensor.

8. The non-transitory computer storage medium as recited in claim 7, wherein the driver sensor is located within the vehicle.

9. The non-transitory computer storage medium as recited in claim 7, wherein the driver sensor is located external to the vehicle.

10. The non-transitory computer storage medium as recited in claim 1, wherein the displaying includes emitting an audible alert.

11. The non-transitory computer storage medium as recited in claim 1, wherein the health condition data associated with the biometric marker is projected such that it is visible on a side window from a location outside of the vehicle.

12. The non-transitory computer storage medium as recited in claim 1, wherein the health condition data associated with the biometric marker is projected such that it is visible on a side window from a location inside of the vehicle.

13. A non-transitory computer storage medium having embodied thereon computer-readable instructions that, when executed, perform a method comprising:
    detecting a biometric marker of a driver of a vehicle; and
    projecting health condition data associated with the biometric marker on a window of the vehicle,
    wherein the health condition data associated with the biometric marker is projected on the window post-travel, after the driver exits the vehicle.

14. The non-transitory computer storage medium as recited in claim 1, wherein the health condition data associated with the biometric marker is projected when the biometric marker exceeds a predetermined parameter.

15. The non-transitory computer storage medium as recited in claim 13, wherein the biometric marker is associated with driver alertness.

16. The non-transitory computer storage medium as recited in claim 13, wherein the detecting is performed via a personal electronic device of the driver.

17. The non-transitory computer storage medium as recited in claim 13, wherein the detecting is performed via a driver sensor.

18. The non-transitory computer storage medium as recited in claim 17, wherein the driver sensor is located within the vehicle.

19. The non-transitory computer storage medium as recited in claim 17, wherein the driver sensor is located external to the vehicle.

20. The non-transitory computer storage medium as recited in claim 13, wherein the displaying includes emitting an audible alert.

* * * * *